United States Patent [19]

Hirshorn et al.

[11] Patent Number: 5,064,670
[45] Date of Patent: Nov. 12, 1991

[54] LOW-SATURATE FRYING FAT AND METHOD OF FRYING FOOD

[75] Inventors: James B. Hirshorn; Timothy W. Dake; Edward R. Purves; Paul Seiden, all of Cincinnati, Ohio

[73] Assignee: The Proctor & Gamble Company, Cincinnati, Ohio

[21] Appl. No.: 505,375

[22] Filed: Apr. 6, 1990

[51] Int. Cl.$^5$ .............................................. A23D 9/00
[52] U.S. Cl. ................................... 426/607; 260/409; 260/410.7; 426/601; 426/606
[58] Field of Search ........................ 426/601, 606, 607; 260/409, 410.7

[56] References Cited

U.S. PATENT DOCUMENTS

| | | |
|---|---|---|
| 2,468,799 | 5/1949 | Ziels et al. |
| 2,614,937 | 10/1952 | Baur et al. |
| 2,801,177 | 7/1957 | Lutton |
| 3,102,814 | 9/1963 | Thompson |
| 3,253,927 | 5/1966 | Going et al. |
| 3,298,837 | 1/1967 | Seiden |
| 3,597,229 | 8/1971 | Mijnders et al. |
| 3,687,989 | 8/1972 | Baltes ................................. 260/409 |
| 3,856,831 | 12/1974 | Tateishi et al. ............ ........ 260/409 |
| 3,872,028 | 3/1975 | Rijnten et al. ...................... 252/439 |
| 3,914,453 | 10/1975 | Gawrilow ........................... 426/155 |
| 3,949,105 | 4/1976 | Wieske et al. ...................... 426/607 |
| 4,041,188 | 8/1977 | Cottier et al. ...................... 426/607 |
| 4,087,564 | 5/1978 | Poot et al. .......................... 426/603 |
| 4,118,342 | 10/1978 | Debus et al. ....................... 252/439 |
| 4,169,843 | 10/1979 | Snyder ................................ 260/409 |
| 4,260,643 | 4/1981 | Cochran ............................. 426/606 |
| 4,268,534 | 5/1981 | Dawada et al. .................... 426/607 |
| 4,567,056 | 1/1986 | Schmidt ............................. 426/607 |
| 4,590,087 | 5/1986 | Pronk et al. ....................... 426/603 |
| 4,656,045 | 4/1987 | Bodor et al. ....................... 426/601 |
| 4,883,684 | 11/1989 | Yang .................................. 426/607 |

FOREIGN PATENT DOCUMENTS

| | | |
|---|---|---|
| 57-83256 | 5/1982 | Japan |
| 2182942 | 5/1987 | United Kingdom |

OTHER PUBLICATIONS

"The Role of Fat in Doughnut Frying", The Doughnut Book, Ch. 10, pp. 53–60, Published by Naif Publishing, Ltd., 1984.

Downs, David E., "The Importance of the Frying Medium in Doughnut Frying", The Bakers Digest, Apr. 1963, pp. 66–69.

Abraham, V. and J. M. de Man, "Removal of Sulfur Compounds from Canola Oil", J. Amer. Oil Chem. Soc., vol. 65, pp. 392–395.

Okonek, D. G., "Nickel-Sulfur Catalysts for Edible Oil Hydrogenation", printed as Ch. 5 of Hydrogenation: Proceedings of An AOCS Colloquim, pp. 65–88, edited by Robert Hastert (1987).

Carr, R. A., "Hydrogenation Feedstock", printed as Ch. 6 in Hydrogenation: Proceedings of An AOCS Colloquim, pp. 89–98, edited by Robert Hastert (1987).

Ostrander, A. J., J. K. Abbott, and A. M. Campbell, "Shortening Power and Related Properties of Fat as Affected by Substitution of Elaidinized Lipid", The Bakers Digest, vol. 45, No. 2, pp. 28–38.

*The Doughnut Book*, Naif Publishing, Ltd. 1984, Ch. 10, "The Role of Fat in Doughnut Frying", pp. 53–60.

Down, D. E., "The Importance of the Frying Medium in Doughnut Frying", *The Baker's Digest*, Apr. 1963, pp. 66–69.

*Primary Examiner*—Donald E. Czaja
*Assistant Examiner*—Leslie Wood
*Attorney, Agent, or Firm*—Karen F. Clark; John M. Howell; Richard C. Witte

[57] ABSTRACT

A frying fat exhibiting a reduced concentration of saturates is disclosed. Said low-saturate frying fat is particularly useful in confectionary applications and is comprised of about 40% to about 80% intermediate-melting fat, and about 20% to about 60% unhydrogenated or partially-hydrogenated base oil. If desired, said frying fat may also contain less than about 7% fully- or substantially- hydrogenated hardstock having an iodine value of about 20 or less. Said intermediate-melting fat comprises from about 14% to about 35% $C_{12}$–$C_{18}$ saturated fatty acids; at least about 40% trans-isomers of unsaturated fatty acids (by percentage of total fat); at least about 46% of all double bonds in the trans-configuration; at least about 40% solids (SFC) at 21.1° C. (70° F.); and has an iodine value of about 55 to about 75. Said base oil comprises no more than about 11% $C_{12}$–$C_{18}$ saturated fatty acids and has an iodine value of about 75 or more.

27 Claims, No Drawings

LOW-SATURATE FRYING FAT AND METHOD OF FRYING FOOD

TECHNICAL FIELD

The present invention relates to a frying fat exhibiting a reduced concentration of saturates.

BACKGROUND INFORMATION

Frying fats are conventionally produced by the appropriate thermal and mechanical treatment of a mixture of fats consisting of one, two, or three components. In the production of confectionary frying fats, the components must be used together in a properly coordinated fashion to insure that the frying fats exhibit the desired level of solids at the temperatures to which said frying fat is subjected during production of the confection. For example, the amount of solids at or around room temperature, i.e., 21.1° C. (70° F.) determines how satisfactorily any sugar-based glaze or coating will adhere to the surface of the confectionary food product. In frying fats other than those used for frying confections, it is generally necessary to have sufficient solids in the frying fat to achieve an acceptable finished fried food product. In addition, the amount of solids at a temperature significantly above mouth temperature, i.e., 40.6° C. (105° F.), determines the crystal set-up rate for confectionary frying fats, as well as other types of frying fats, which in-turn determines the degree of waxiness or mouthcoat perceived by the consumer upon ingestion of the fried food product.

Confectionary frying fats are comprised of an intermediate-melting, partially-hydrogenated semi-solid fat, commonly called "intermediate-melting fat" and an unhydrogenated or partially hydrogenated liquid oil or "base oil". In addition, depending upon the characteristics of the intermediate melting fat and/or the base oil, said confectionary frying fat may consist of a substantially- or wholly-hydrogenated solid fat, commonly called "hardstock". Generally, conventional confectionary frying fats contain from about 20% to about 60% solids (Solid Fat Content, hereinafter "SFC") at 21.1° C. (70° F.) and from about 2% to about 10% solids (SFC) at 40.6° C. (105° F.). As a result, conventional frying fats generally contain from about 23% to about 48% saturated fatty acids (i.e., $C_{12}$–$C_{18}$ saturated fatty acid ester groups, also referred to hereinafter as "saturates").

Recently, public consciousness has been raised regarding the dietary intake of saturated fats and the relationship of said dietary intake with serum cholesterol levels and with the HDL/LDL ratio therein, i.e., the ratio of high density lipoproteins (hereinafter HDL, i.e., "good" cholesterol) to low density lipoproteins (hereinafter LDL, i.e., "bad" cholesterol). See, for example, "Saturated Fats and Coronary Heart Disease," by Scott M. Grundy, M.D., Ph.D., in *Current Concepts of Nutrition*, Vol. 10, pp. 57–78 (1981) for an examination of the elevating effect of saturated fats on total serum cholesterol and on atherosclerosis. For a study demonstrating that mono- and polyunsaturates lower LDL cholesterol as compared to saturates, see "Comparison of Effects of Dietary Saturated, Monounsaturated, and Polyunsaturated Fatty Acids on Plasma Lipids and Lipoproteins in Man" by Fred H. Mattson and Scott M. Grundy, in *Journal of Lipid Research*, Vol. 26, pp. 194–202 (1985).

It has surprisingly been found that, by utilizing a specially hydrogenated intermediate-melting fat in combination with a base oil low in saturates, and a hardstock, if desired, in a confectionary or other type of frying fat, the amount of saturates necessary to achieve the desired level of solids in the frying fat formulation is reduced. This is accomplished predominantly by the reduction of the amount of saturates in the base oil and/or the intermediate-melting fat. The said reduction of saturates is made possible because of the presence of the said specially-hydrogenated intermediate-melting fat which more efficiently utilizes the saturated fatty acids and trans-isomers of unsaturated fatty acids in the fatty components of the frying fat formulation to form solids; accordingly, sufficient solids are formed more efficiently and with less saturates, thereby achieving the desired level of solids in the resulting frying fat. Accordingly, the low saturate frying fat of the present invention has from about 10% to about 20% saturates, as compared to conventional confectionary frying fats which have from about 23% to about 48% saturates.

It is therefore an object of the present invention to provide a low-saturate confectionary frying fat suitable for use in the preparation of a broad range of confectionary applications, consisting of, but not limited to, doughnuts, cruellers, fritters, turnovers, danishs, and the like.

It is also an object of the present invention to provide a low-saturate confectionary frying fat, which, despite its low level of saturated fatty acids, has the requisite amount of solids necessary to yield high-quality confections.

It is also an object of the present invention to provide a low-saturate frying fat which is useful not only as a confectionary frying fat, but can also be used to fry other fried food products including, but not limited to, fried fish, shrimp, and chicken, fried vegetables, french fries, and the like, whether or not coated with batter or breading.

These and other objects of the present invention will become clear by the disclosure herein.

All percentages and ratios herein are by weight unless otherwise specified.

SUMMARY OF THE INVENTION

The present invention is directed to a frying fat composition which has a reduced level of saturates. Said low-saturate frying fat comprises: 1) less than about 20%, preferably less than about 18%, $C_{12}$–$C_{18}$ saturated fatty acids; 2) from about 25% to about 45%, preferably from about 30% to about 40%, solids (SFC) at 21.1° C. (70° F.) and less than about 8%, preferably less than about 5%, solids (SFC) at 40.6° C. (105° F.).

The low-saturate frying fat of the present invention is comprised of up to three components: 1) the specially hydrogenated intermediate-melting fat; 2) the base oil; and 3) a hardstock, if desired. Accordingly, the frying fat of the present invention comprises:

1) from about 40% to about 80%, preferably from about 50% to about 70%, of a specially hydrogenated intermediate-melting fat, said fat comprising about 14% to about 35%, preferably about 16% to about 30%, $C_{12}$–$C_{18}$ saturated fatty acids; preferably no more than about 15%, most preferably no more than about 12%, $C_{16}$ saturated fatty acids; preferably no more than about 12%, more preferably no more than about 8%, most preferably no more than about 3%, $C_{18:2}$ fatty acids; at least about 40%, preferably at least about 45%, trans-isomers of unsaturated fatty acids; at least about 46%, preferably at least about 55%, of all double bonds in the trans configuration; at least about 40%, preferably at least about 45%, solids (SFC) at 21.1° C. (70° F.); and an iodine value of about 55 to about 75, preferably of about 60 to about 70; and 2) from about 20% to about 60%, preferably from about 30% to about 50%, unhydrogenated or partially-hydrogenated base oil, said base oil comprising no more than about 11%, preferably no more than about 8%, $C_{12}$–$C_{18}$ saturated fatty acids; an iodine value of about 75 or more, preferably of about 77 or more; and preferably no more than about 20% trans-isomers of unsaturated fatty acids.

It is also preferable that said base oil comprises no more than about 5% $C_{18:3}$ fatty acids.

If desired, the frying fat of the present invention can additionally comprise less than about 7%, preferably less than about 5%, most preferably less than about 3%, fully- or substantially-hydrogenated hardstock, said hardstock having an iodine value of about 20 or less, preferably of about 10 or less, most preferably of about 5 or less.

The term "low-saturate frying fat" as used herein refers to a frying fat which is particularly useful in the frying of a broad range of confectionary applications including, but not limited to, doughnuts, cruellers, fritters, danishs, turnovers, and the like. Said frying fat is also useful in other non-confectionary food applications, including, but not limited to frying fish, shrimp, chicken, vegetables and the like, whether or not coated with batter or breading. Said frying fat also has from about 10% to about 20% saturated fatty acids while conventional frying fats generally have from about 23% to about 48% saturated fatty acids.

The term "specially hydrogenated intermediate-melting fat" as used herein describes the product resulting from the selective hydrogenation of a vegetable and/or animal oil (including, for example, marine oil) to an Iodine Value of from about 55 to about 75, preferably from about 60 to about 70, and which provides intermediate-melting solids in the low-saturate frying fat.

The term "base oil" as used herein refers to an oil which is substantially liquid at room temperature and has an Iodine Value of about 75 or more, preferably about 77 or more. The base oil can be an unhydrogenated oil, a partially-hydrogenated oil, or a blend of unhydrogenated and partially-hydrogenated oils.

As used herein, the term "fully- or substantially-hydrogenated hardstock" relates to solid fats which have an Iodine Value of about 20 or less, preferably about 10 or less, most preferably of about 5 or less. The hardstock suitable for use, if desired, in the low-saturate frying fat of the present invention is generally identical to that used in conventional frying fats and generally has from about 86% to about 99% saturates.

The term "fatty acid" as used herein refers to the fatty acid ester portion of the respective glyceride.

The terms "saturates, saturated fats", and "saturated fatty acids" as used herein all refer to $C_{12}$–$C_{18}$ saturated fatty acid esters, unless otherwise indicated.

DETAILED DESCRIPTION OF THE INVENTION

The present invention relates to a low-saturate frying fat which comprises: less than about 20%, preferably less than about 18%, saturated $C_{12}$–$C_{18}$ fatty acids; and preferably from about 25% to about 45%, preferably from about 30% to about 40%, solids (SFC) at 21.1° C. (70° F.) and less than about 8%, preferably less than about 5%, solids (SFC) at 40.6° C. (105° F.).

GCFAC (Gas Chromatography Fatty Acid Composition) is used to define the frying fat of the present invention and the fatty acid composition of the components thereof. The method used is explained in Section A of the Analytical Methods section herein.

The level of trans-isomers of unsaturated fatty acids in the specially hydrogenated intermediate-melting fat and the base oil utilized in the low-saturate frying fat utilized in the present invention is measured by Infrared Spectrophotometry. The method used is explained in Section B of the Analytical Methods section herein.

The frying fat of the present invention is comprised of: 1) from about 40% to about 80%, preferably about 50% to about 70%, of a specially hydrogenated intermediate-melting fat, and 2) from about 20% to about 60%, preferably from about 30% to about 50% of an unhydrogenated or partially-hydrogenated base oil. If desired, the frying fat of the present invention may additionally comprise less than about 7%, preferably less than about 5%, most preferably less than about 3%, of a fully- or substantially hydrogenated hardstock.

Said specially-hydrogenated intermediate-melting fat comprises: 1) from about 14% to about 35%, preferably from about 16% to about 30%, $C_2$–$C_{18}$ saturated fatty acids; 2) preferably no more than about 15%, most preferably no more than about 12% C16 saturated fatty acids; 3) preferably no more than about 12%, more preferably no more than about 8%, most preferably no more than about 3%, $C_{18:2}$ fatty acids; 4) at least about 40%, preferably at least about 45% trans-isomers of unsaturated fatty acids; 5) at least about 46%, preferably at least about 55%, of all double bonds in the trans-configuration: 6) at least about 40%, preferably at least about 45%, solids (SFC) at 21.1° C. (70° F.); and 7) an iodine value of about 55 to about 75, preferably of about 60 to about 70.

As previously stated herein, the intermediate-melting fat has a solids content (SFC) of at least about 40%, preferably at least about 4%, at 21.1° C. (70° F.). The SFC provides a reasonable approximation of the percent by weight solids of a particular fatty material at a given temperature. The method of measuring the SFC of the intermediate melting fat and of the finished frying fat is performed according to the method described by Madison and Hill, *J. Amer. Oil Chem Soc.*, Vol. 55, (1978), pp. 328-31, incorporated by reference herein and is set forth in Section C of the Analytical Methods section herein following the Examples.

Said unhydrogenated or partially-hydrogenated base oil has an iodine value of about 75 or more, preferably of about 77 or more; has no more than about 11%, preferably no more than about 8%, $C_{12}$–$C_{18}$ saturated fatty acids; preferably no more than about 20% trans-isomers of unsaturated fatty acids; and preferably no more than about 5% $C_{18:3}$ fatty acids.

Said fully or substantially hydrogenated hardstock has an iodine value of about 20 or less, preferably about 10 or less, most preferably of about 5 or less.

It is possible to achieve the desired level of solids in the low-saturate frying fat of the present invention by making more efficient use of saturated and trans fatty acid components to form solids. The intermediate-melting fat of the present invention has a relatively high proportion of unsaturated fatty acids in the trans configuration. The trans-isomers of unsaturated fatty acids help form the intermediate-melting solids and reduce the amount of saturates needed to form these solids. It is believed that the most desirable triglyceride for forming the intermediate-melting solids contains one saturated fatty acid and two trans mono-isomers of unsaturated fatty acids per triglyceride molecule. It is believed that this triglyceride is a major component of the intermediate melting fat of this invention. However, other combinations of trans, cis, and saturated fatty acids also exist as triglycerides in the intermediate-melting fat and also contribute to solids in the low-saturate frying fat.

Since the base oil contributes very few solids to the low-saturate frying fat, it is preferred to keep the concentrations of the saturates in the base oil as low as possible. Saturates and trans-unsaturates of the frying fat should be utilized as much as possible in the hardstock and intermediate-melting fat to form solids, rather than using them in the base oil where their functionality is greatly reduced.

THE COMPONENTS OF THE LOW-SATURATE ALL-PURPOSE SHORTENING

A. The Specially Hydrogenated Intermediate-Melting Fat

The low-saturate frying fat of the present invention consists of from about 40% to about 80%, preferably about to about 70%, of an intermediate-melting fat. The intermediate-melting fat is made by subjecting a suitable vegetable and/or animal oil to hydrogenation under highly selective conditions so that the resulting intermediate-melting fat has the following characteristics:

1) from about 14% to about 35%, preferably from about 16% to about 30%, saturated $C_{12}$-$C_{18}$ fatty acids;
2) preferably no more than 15%, most preferably no more than about 12%, C16 saturated fatty acids;
3) preferably no more than about 12%, more preferably no more than about 8%, most preferably no more than about 3%, C18:2 fatty acids;
4) at least about 40%, preferably at least about 45%, trans-isomers of unsaturated fatty acids, (by percentage of total fat);
5) at least about 46%, preferably at least about 55%, of all double bonds in the trans-configuration;
6) at least about 40%, preferably at least about 45%, solids (SFC) at 21.1° C. (70° F.); and
7) an iodine value (I.V.) of about 55 to about 75, preferably of about 60 to about 70.

The specially hydrogenated intermediate-melting fat provides the intermediate-melting solids necessary to achieve a sufficient content of solids in the low-saturate frying fat of the present invention predominately by the presence of $C_{18:1}$ trans fatty acids in the triglycerides. Said intermediate-melting fat is selectively hydrogenated, preferably by using a sulfur-treated nickel catalyst. However, other catalysts may be used so long as the intermediate-melting fat has the required characteristics. Sulfur-treated catalysts are particularly suitable for use since they promote the rapid development of trans isomers during hydrogenation. See, e.g. Okonek, Douglas V., "Nickel-Sulfur Catalysts For Edible Oil Hydrogenation," printed as Chapter 5 of *Hydrogenation: Proceedings of An AOCS Colloquium*, edited by Robert Hastert, 1987. The sulfur-treated catalyst suitable for use in the present invention can be prepared by any method known in the art.

A preferred sulfur-treated catalyst is Nysel SP-7 (manufactured by Engelhard Corporation, Catalyst and Chemicals Division, Edison, N.J. 08818). This catalyst contains about 1% sulfur and 20% nickel. It is typically used at a concentration of about 0.25% to about 1.0% of the oil to be hydrogenated.

The process described herein for making the intermediate-melting fat is a batch hydrogenation process. However, any type of commercially acceptable processing operation, including, but not limited to, batch hydrogenation, continuous processing, recirculation systems, and "dead-end" systems, may be utilized.

Hydrogenation is normally carried out in from about 1.5 hours to about 6 hours. The hydrogen pressure exerted during hydrogenation ranges from about 0 PSIG to about 150 PSIG and the temperature ranges from about 160° C. (320° F.) to about 260° C. (500° F.). The temperature of the reaction is gradually increased from about 160° C. (320° F.) to about 200° C. (392° F.), and preferably about 180° C. (356° F.), to a final temperature of from about 220° C. (428° F.) to about 260° C. (500°F.), and preferably about 240° C. (464° F.). The lower temperatures are preferred at the beginning of hydrogenation to avoid polymerization of $C_{18:3}$-containing triglycerides. The higher temperatures are preferred near the end of the reaction, after most of the $C_{18:3}$ is hydrogenated, to accelerate the reaction. The reaction is terminated when the iodine value (I.V.) reaches a value of from about 55 to about 75, and preferably from about 60 to about 70. Other reaction conditions may be employed so long as the resulting intermediate-melting fat meets the specifications stated herein.

Sulfur treated nickel selective hydrogenation is described in the following U.S. patents, all incorporated by reference herein: U.S. Pat No. 2,468,799 to Ziels et al. (assigned to Lever Bros. Co.), issued May 3, 1949; U.S. Pat. No. 3,687,989 to Baltes, issued Aug. 29, 1972; U.S. Pat. No. 3,872,028 to Rijnten (assigned to Lever Bros. Co.), issued Mar. 18, 1975; U.S. Pat. No. 4,041,188 to Cottier et al. (assigned to Lever Bros. Co.), issued Aug. 9, 1977; U.S. Pat. No. 4,061,798 to Kanegae et al., issued Dec. 6, 1977; U.S. Pat. No. 4,087,564 to Poot et al. (assigned to Lever Bros. Co.), issued May 2, 1978; U.S. Pat. No. 4,118,342 to Debus et al. (assigned to Labofina, S.A.), issued Oct. 3, 1978; and U.S. Pat. No. 4,169,843 to Snyder (assigned to Kraft, Inc.), issued Oct. 2, 1979. During the sulfur-treated nickel selective hydrogenation, $C_{18:1}$ trans-isomers are rapidly and selectively formed. $C_{18:2}$ (linoleic) and $C_{18:3}$ (linolenic) fatty acids are selectively hydrogenated to yield $C_{18:1}$ fatty acids. The $C_{18:1}$ cis fatty acids are isomerized to $C_{18:1}$ trans and other C18:1 cis isomers where the double bond has migrated to another position along the alkyl fatty acid chain.

To achieve the specially hydrogenated intermediate-melting fat having the above-specified characteristics via selective hydrogenation using a sulfur-treated nickel catalyst, various source oils are suitable. These oils should preferably have a level of total saturates of less than about 35%, most preferably less than about 30%, and should also preferably have less than about 15%, most preferably less than about 12%, $C_{16}$ saturated fatty acids. Accordingly, suitable source oils are selected from the group consisting of, but not limited to, soybean, cottonseed, peanut, olive, corn, menhaden, herring, linseed, sesame, rice, bran, perrilla, canola, safflower, sunflower, and sorghum. Palm oil is also a suitable source oil, but must be used in a blend with one or more of the suitable source oil listed herein immediately above. Certain oil fractions such as, but not limited to, cottonseed olein and palm olein are suitable. Mixtures of the above source oils, source oil blends, and source oil fractions are also suitable for use herein.

The intermediate-melting fat has an iodine value (I.V.) of from about 55 to about 75, preferably from about 60 to about 70. The I.V. of a fat or oil indicates the number of grams of Iodine equivalent to halogen absorbed by a 100 gram sample. Because the halogen absorbance is due to the double bonds present in the fatty acid residues attached to the glycerides, the I.V. of a fat or oil can give a general indication of solids content at a given temperature. As the fatty acid residues become more saturated, the fat or oil increases in solids content. In general, the lower the I.V of a given fat or oil, the greater will be the solids content at a given temperature. The I.V. of a fat or oil can be determined by the AOCS Official Method Col. 1-25, also known as the Wijs method.

B. The Base Oil

The base oil to be utilized in the frying fat of the present invention is an oil which has an iodine value of about 75 or more, preferably of about 77 or more, and which is substantially liquid at room temperature. In addition, said base oil is an unhydrogenated or partially-hydrogenated fat which has no more than about 11%, preferably no more than about 8%, $C_{12}$–$C_{18}$ saturated fatty acids. It is also preferable that said base oil comprise no more than about 5% $C_{18:3}$ fatty acids; and preferably no more than about 20% trans-isomers of unsaturated fatty acids.

To achieve a base oil exhibiting the above-specified characteristics, it is preferable to utilize a partially-hydrogenated (I.V.=95–107) canola oil or other partially-hydrogenated oil which is low in saturates, (i.e., sunflower oil with 5% saturated fatty acids). Canola oil is particularly suitable because it has the desired low level of saturated fatty acids. However, canola oil typically also contains high levels (e.g., 7-12%) of C18:3 fatty acid (linolenic acid). Lower C18:3 levels can result in improved flavor stability and/or fry-life stability. Therefore, in the preferred embodiment, the C18:3 level should be no more than 5% of the base oil.

One way of achieving a base oil with the preferred composition is to utilize partially-hydrogenated canola oil The canola oil is hydrogenated under selective conditions, using a nickel catalyst, to an I.V. of about 95-107. By hydrogenating under selective conditions, the level of C18:3 is reduced, with only a small increase in the level of saturates.

Before hydrogenating the canola oil, it may be desirable to reduce the level of catalyst poisons in the oil. Catalyst poisoning is believed to be due primarily to sulfur containing compounds in the oil. See, e.g., Carr, R.A., "Hydrogenation Feedstock" printed as Chapter 6 in *Hydrogenation: Proceedings of an AOCS Colloquim* - Robert Hastert, Editor (1987) American Oil Chemists Society, Champaign, Ill., hereby incorporated by reference herein. These sulfur compounds are believed to absorb onto the nickel catalyst surface in the early part of the hydrogenation process. Use of the poisoned catalyst will result in greater formation of trans-isomers during hydrogenation, with higher levels of sulfur compounds in the oil resulting in higher trans levels in the partially-hydrogenated oil. Trans isomers in the base oil are not desirable, since they do not contribute significantly to the frying fat solids, but add to the total trans in the low-saturate frying fat. While the formation of trans-isomers cannot be completely eliminated, the amount formed can be reduced by first reducing the amount of sulfur poisons in the oil prior to hydrogenation. For additional information regarding reducing the amount of said sulfur poisons see Abraham, V. & De-Mann, J.M., "Removal of Sulfur Compounds from Canola Oil," Journal of American Oil Chemists Society, Vol. 65, p. 392, (1988), hereby incorporated by reference herein.

While several methods may be used to reduce the amount of catalyst poisons in the oil, a preferred method is to first pretreat the oil with catalyst, as set forth in Example V herein. Nickel catalyst is added to the oil and the oil is heated. The catalyst, with adsorbed sulfur compounds, is then filtered out of the oil. Following this, the oil is hydrogenated using fresh catalyst.

Other oils, both hydrogenated and unhydrogenated, are also suitable for the preferred embodiment, as long as they meet the above-specified characteristics. This includes varieties of canola which are naturally low in $C_{18:3}$ fatty acids(e.g., Stellar canola oil), and which would not require partial-hydrogenation. Accordingly, there would be no generation of trans-isomers of unsaturated fatty acids because there would be no hydrogenation.

Although partially-hydrogenated canola oil is preferably used to make a base oil suitable for use in the low-saturate frying fat of the present invention, the source oils and/or the method used to make the base oil are not important, so long as the base oil is an unhydrogenated or partially-hydrogenated oil which has no more than about 11%, preferably no more than about 8%, $C_{12}$–$C_{18}$ saturated fatty acids; preferably no more than about 5% $C_{18:3}$ fatty acids; and preferably no more than about 20% trans-isomers of unsaturated fatty acids. Of course, genetically bred source oils having the requisite characteristics would be suitable.

C. The Hardstock

The low-saturate frying fat of the present invention may additionally contain, if desired, less than about 7%, preferably less than about 5%, most preferably less than about 3%, hardstock. Said hardstock is solid at room temperature and provides solids from saturated fatty acids. Said solids may be needed to provide high temperature stability to, and to contribute to the desired level of solids to, the low-saturate frying fat. The hardstock is made by the substantial or total hydrogenation (I.V. 20 or less, preferably 10 or less, and most preferably 5 or less) of a suitable oil or mixtures thereof. Suitable oil(s) may be chosen from the group consisting of, but not limited to, soybean oil, canola oil, cottonseed oil, palm oil, peanut oil, corn oil, cottonseed stearin, palm mid-fraction, palm olein, or mixtures thereof. Palm stearin may be used in blends.

PREPARATION OF THE LOW-SATURATE FRYING FAT

The low-saturate frying fat of the present invention can be made by any process known to one skilled in the art. There is no special apparatus or processing equipment needed; the only requirement is that the three fatty components of the composition, i.e. the specially hydrogenated intermediate-melting fat, the base oil, and/or the hardstock, if desired, exhibit the characteristics described herein. Most important, of course, is that the intermediate-melting fat have the requisite composition of trans-isomers of unsaturated fatty acids so that the saturates in the composition will be utilized more efficiently, thereby forming sufficient solids to achieve a frying fat exhibiting the desired level of solids while utilizing a decreased amount of saturates.

The low-saturate frying fat of the present invention can be prepared by various conventional means well known in the art for processing conventional frying fats. In general, conventional methods of preparing said frying fat involve the steps of (1) heating the said frying fat to a temperature (e.g. 39°-93° C.; 100°-200° F.) above the melting point of its solid components to form a melt; (2) injecting edible gas (e.g. 10-25 volume percent) into the melt; (3) passing the melted frying fat through a scraped wall heat exchanger (e.g. to 7°-26.7° C.: 45°-80° F.), in a unit such as a "Votator", to form a super-cooled mixture containing small crystals; (4) continuing crystallization into the plastic state while mildly agitating in one or more stages; (5) filling into suitable containers: and then, if desired, (6) tempering at a constant temperature (e.g. 27°-32° C.; 80°-90° F.) while at rest for several hours (e.g. 12-60 hours).

As previously stated, the low-saturate frying fat of the present invention can be made by any process known in the art, so long as the composition of the low-saturate frying fat, and the components therein, is as described herein. Said processes can be varied by one skilled in the art to achieve the frying fat of the present invention. Suitable methods and apparati are described in the following U.S. patents, all incorporated by reference herein: U.S. Pat. No. 2,430,596 to Ziels et al. (assigned to Lever Bros. Co.), issued Nov. 11, 1947; U.S. Pat. No. 2,614,937 to Baur et al. (assigned to The Procter & Gamble Co.), issued Oct. 21, 1952; U.S. Pat. No. 2,801,177 to Lutton (assigned to The Procter & Gamble Co.), issued July 30, 1957; U.S. Pat. No. 3,102,814 to Thompson (assigned to Lever Bros. Co.), issued Sept. 3, 1963; U.S. Pat. No. 3,253,927 to Going et al. (assigned to The Procter & Gamble Co.), issued May 31, 1966; and U.S. Pat. No. 3,597,230 to Colby et al. (assigned to The Procter & Gamble Co.), issued Aug. 3, 1971.

EXAMPLES

EXAMPLE I

Specially Hydrogenated Intermediate Melting Fat

A specially hydrogenated intermediate-melting fat for use in the low-saturate frying fat of the present invention is prepared as follows:

A 400 pound blend consisting of 70% soybean oil (I.V.=133) and 30% cottonseed oil (I.V.=107) is prepared and is then deaerated at 49° C. (120° F.) for approximately 15 minutes at an absolute pressure of 3 millimeters Hg. The resulting oil blend is placed into a 400 lb. batch hardening unit (Serial #33183, Leader Iron Works, Inc., Decatur, Ill.) and heated to 171° C. (340° F.) under nitrogen. 675 grams of nickel-sulfur catalyst (Nysel SP-7, Engelhard Corporation, Catalyst and Chemicals Division, Edison, N.J. 08818) is added and hydrogen is bubbled through the batch hardening unit at a pressure of 0 pounds per square inch-gauge (hereinafter PSIG). Progress of the reaction is monitored by measuring the Refractive Index (RI)*. The reaction proceeds as follows:

*Refractive Index (R.I.) is conducted at 60° C. (140° F.) (Butyro Scale). Variations in the R.I. of fats, along with variations in other optical properties of fats, can indicate the structure and compositions of fatty acids and glycerides. Here the drop in R.I. signifies a decrease in the unsaturation of the fatty acids during hydrogenation.

| Time (min.) | Temperature °C. | (°F.) | Pressure (PSIG) | Refractive Index (RI) |
|---|---|---|---|---|
| 0 | 171 | (340) | 0 | 49.8 |
| 120 | 211 | (411) | 0 | 45.2 |
| 150 | 214 | (418) | 0 | 43.4 |
| 180 | 224 | (435) | 20 | 42.0 |
| 225 | 231 | (448) | 83 | 41.0 |
| 270 | 231 | (448) | 144 | 40.4 |

After the reaction proceeds for 150 minutes, an additional 325 grams of Nysel SP-7 catalyst is added. When the reaction reads RI=40.4, the hydrogen is turned off and the resulting intermediate-melting fat is cooled to 66° C. (150° F.). 900 grams of filter aid (Celite 503, Johns-Manville. Co., New York, N.Y.) is added to the intermediate-melting fat and the catalyst is filtered out in a plate and frame filter press (with 1 square foot plates, manufactured by D.R. Sperry Co.).

The resulting intermediate melting fat has an I.V. of 64.5, 24.4% saturated fatty acids (including 14.5% $C_{16}$). 1.2% $C_{18:2}$, and 51.3% trans-isomers of unsaturated fatty acids (68% of all double bonds in the trans configuration)*. The solids content (SFC) of the intermediate melting fat at various temperatures is as follows:

GCFAC (Gas Chromatography Fatty Acid Composition) is used to define the fatty acid composition of the intermediatemelting fat created by the hydrogenation of the fat blend described hereinabove. The method used is explained in Section B of the Analytical Method Section following the Examples. *The content of trans-isomers of unsaturated fatty acids of fats and oils is measured by infrared spectrophotometry. The method used is explained in Section C of the Analytical Method Section following the Examples. The percentage of trans-isomers of fatty acids is based upon the percentage of total fat.

| Temperature °C. | (°F.) | % Solids (SFC) |
|---|---|---|
| 10 | (50) | 79.9 |
| 21 | (70) | 62.1 |
| 27 | (80) | 53.1 |
| 33 | (92) | 29.9 |
| 41 | (105) | 1.8 |

EXAMPLE II

Specially Hydrogenated Intermediate-Melting Fats

Alternative intermediate-melting fats suitable for use in the low-saturate frying fat of the present invention can be prepared from soybean oil or from a soybean/cottonseed oil blend utilizing the method set forth in Example I, except that the reactions are terminated at different I.V. endpoints.

| | Intermediate-Melting Fat Specifications | | | | |
|---|---|---|---|---|---|
| % Soybean | 100 | 100 | 100 | 70 | 70 |
| % Cottonseed | 0 | 0 | 0 | 30 | 30 |
| I.V. | 69 | 66 | 62 | 69 | 63 |
| Saturates | 20.8 | 21.4 | 27.9 | 20.5 | 26.7 |
| Trans-isomers of unsaturated fatty acids (% of fat) | 54.1 | 54.4 | 50.2 | 53.9 | 49.6 |
| % of double bonds in trans configuration | 67.5 | 70.6 | 69.2 | 67.7 | 67.9 |
| % $C_{16}$ fatty acids | 10.0 | 10.4 | 9.9 | 14.1 | 14.2 |
| % $C_{18:2}$ fatty acids | 2.8 | 0.4 | 1.6 | 2.9 | 1.9 |
| % Solids (SFC) at 21.1° C. (70° F.) | 64.3 | 63.3 | 67.2 | 53.9 | 65.3 |

-continued

| | Intermediate-Melting Fat Specifications | | | | |
|---|---|---|---|---|---|
| % Solids (SFC) at 40.6° C. (105° F.) | 4.8 | 3.3 | 12.0 | 2.2 | 9.8 |

EXAMPLE III

An alternative intermediate-melting fat suitable for use in the low-saturate frying fat of the present invention is prepared by blending together two different intermediate melting fats. Both intermediate melting fats are prepared separately as described in Example I and are then melted to 120° F.–200° F. and mixed for approximately 30 minutes in an agitated system.

| Components | Wt % | Pounds |
|---|---|---|
| Component #1 (Intermediate Melting Fat of Example II made from 100% soybean oil (IV = 69) prepared as described in Example I) | 50 | 200 |
| Component #2 (Intermediate Melting Fat of Example II made from 100% soybean oil (I.V. = 62) prepared as described in Example I) | 50 | 200 |

| | |
|---|---|
| I.V. | 65.5 |
| Saturates | 24.4 |
| Trans-isomers of unsaturated fatty acids (% of fat) | 52.2 |
| % of double bonds in trans configuration | 68.4 |
| % of $C_{16}$ fatty acids | 10.0 |
| % of $C_{18:2}$ fatty acids | 2.2 |
| % Solids (SFC) at 21.1° C. (70° F.) | 65.8 |
| % Solids (SFC) at 40.6° C. (105° F.) | 2.3 |

EXAMPLE IV

Base Oil For Use In Low-Saturate Frying Fat

A base oil suitable for use in the low-saturate frying fat of the present invention is prepared by the following method:

400 pounds of canola oil (I.V.=110) is added into a 400 pound batch hardening unit (Serial #33189, Leader Iron Works, Inc., Decatur, Ill.) and heated to 152° C. (305° F.). 65 grams of fresh nickel catalyst (Nysosel 325, Engelhard Corporation, Catalyst and Chemicals Division, Edison, N.J. 08818) is added and hydrogen is bubbled through the oil at 0 PSIG. After about 55 minutes, the reaction is stopped by turning off the hydrogen. The oil is cooled to about 66° C. (150° F.), and 900 grams filter aid is added, and then filtered out as in Example I. The composition of the canola oil before and after hydrogenation is as follows:

| | Before Hydrogenation | After Hydrogenation |
|---|---|---|
| % saturates | 6.3 | 7.4 |
| % $C_{18:3}$ fatty acids | 7.5 | 3.8 |
| % trans-isomers | 0.0 | 12.4 |
| I.V. | 110 | 100 |

EXAMPLE V

Base Oil For Use In Low-Saturate Frying Fat

A base oil which is produced by a process which minimizes the increase in saturated and trans-fatty acids, and is especially suitable for use in the low-saturate frying fat of the present invention is prepared in a manner similar to Example IV. However, prior to hydrogenation, the canola oil is treated in the following manner to reduce the level of catalyst poisons.

65 grams of fresh nickel catalyst is added to 400 lbs. of canola oil. The oil is heated to 177° C. )350° F.) for one hour in a nitrogen atmosphere in the same vessel used for hydrogenation. The catalyst is then filtered from the oil as in Example IV. The resulting treated oil is then hydrogenated using fresh catalyst as in Example IV, except at 260° C. (320° F.) for 30 minutes. Composition of the canola oil before and after hydrogenation is as follows:

| | Before Hydrogenation | After Hydrogenation |
|---|---|---|
| % saturates | 6.3 | 6.8 |
| % $C_{18:3}$ fatty acids | 7.5 | 3.4 |
| % trans-isomers | 0 | 10.8 |
| I.V. | 110 | 100 |

EXAMPLE VI

Low-Saturate Confectionary Frying Fat 400 pounds of a low-saturate confectionary frying fat of the present invention is prepared as follows:

| Components | Wt. % | Pounds |
|---|---|---|
| Intermediate-Melting Fat (100% soybean oil intermediate-melting fat of Example II (I.V. = 66) prepared as described in Example I) | 69 | 276 |
| Base oil (prepared as described in Example IV) Canola Oil I.V. = 100) | 31 | 124 |

The intermediate-melting fat and the base oil are blended and are then deodorized at 263° C. (505° F.) for approximately 2.5 hours at an absolute pressure of approximately 6-8 millimeters Hg. The resulting mixture is cooled to 6.6° C. (150° F.).

A confectionary frying fat is made from this mix in the following manner. The mix is melted at 54° C. (130° F.). Approximately 12.5%–14.5% by volume nitrogen is continuously injected into the oil and it is pumped through a scraped wall heat exchanger ("Votator") in which the oil is rapidly chilled with agitation to 21° C. (70° F.) in less than about two minutes. The chilled supercooled mixture is then passed through an agitated unrefrigerated crystallization vessel known as a picker box and then packed into fifty (50) pound cubes. The product is tempered at 29° C. (85° F.) for 48 hours.

The resulting plastic confectionary frying fat contains 17.1% saturates, 38% solids (SFC) at 21% (70° F.) and 0.6% solids (SFC) at 41° C. (105° F.).

EXAMPLE VII

Low-Saturate, Confectionary Frying Fat

Another low-saturate, confectionary frying fat is prepared as described in Example VI with the following composition:

| Components | Wt. % | Pounds |
|---|---|---|
| Intermediate-melting fat made from 100% soybean oil (I.V. = 66) of Example II, prepared as described in Example I) | 60 | 240 |
| Base Oil (prepared as described in Example V) | 40 | 160 |

The confectionary frying fat is processed as described in Example V. The frying fat contains 15.6% saturates, 33% solids at 21° C. (70° F.), and 0.5% solids (SFC) at 41° C. (105° F.)

ANALYTICAL METHODS

A. Fatty Acid Composition (GCFAC Values)

Principle

The fatty acid composition of the triglycerides of the fatty components of the low-saturate frying fat of the present invention is measured by gas chromatography. First, fatty acid methyl esters of the triglycerides of the various components, are prepared by any standard method (e.g., by transesterification using sodium methoxide), and then separated on a capillary column which is coated with SP-2340 stationary phase. The fatty acid methyl esters are separated by chain length and degree of unsaturation. A split injection is made with flame ionization detection. Quantitation is performed by an area normalization method. This method can separate fatty acid methyl esters from C14 to C24.

| Equipment | |
|---|---|
| Gas Chromatograph | Hewlett-Packard 5880A, or equivalent, equipped with a capillary injection system and flame ionization detector, Hewlett-Packard Co., Scientific Instruments Div., 1601-T California Ave., Palo Alto, CA 94304 |
| Injector | Autosampler Hewlett-Packard 7671-A, or equivalent |
| Column | 60 meters × 0.25 millimeter inner diameter, fused silica capillary column coated with SP-2340 (0.20 micron film thickness Supelco #2-4023), Hewlett-Packard Co., Scientific Instruments Div. |
| Data System | Hewlett-Packard 3350 Laboratory Automation System, 3000-T Hanover St., Palo Alto, CA 94304 |
| Recorder | Kipp & Zonen, BD40, Kipp & Zonen |
| Syringe | 10 uL, Hamilton 701N |

Reference Standards

One reference standard of fatty acid methyl esters (FAME) is used each day of operation to verify proper operation of this method. A reference mixture of fatty acid methyl esters (FAME) is used to check the operation of the instrument. Said reference mixture has the following fatty acid composition: 1% $C_{14:0}$, 4% $C_{16:0}$, 3% $C_{18:0}$, 45% $C_{18:1}$, 15% $C_{18:2}$, 3% $C_{18:3}$, 3% $C_{20:0}$, 3% $C_{22:0}$, 20% $C_{22:1}$, and 3% $C_{24:0}$.

The reference mixture of FAME should be diluted with hexane and then injected into the instrument. A new vial of FAME reference mixture should be opened every day since the highly unsaturated components, $C_{18:2}$ and $C_{18:3}$, oxidize easily. The results from the reference standards should be compared with the known values and a judgment made concerning the completed analysis. If the results of the reference standards are equal to or within ± 2 standard deviations of the known values, then the equipment, reagents and operations are performing satisfactorily.

1. Instrumental Set-up
   a. Install the column in the gas chromatograph, and set up the instrumental conditions as defined immediately below under *Instrumental Conditions*.
   b. Set up the data system with the appropriate method to acquire and analyze the data. The retention times may have to be adjusted in the method due to instrument variations. Consult the data system reference manual on how to do this -- HP3350 User's Reference Manual. Unity response factors are used for each component.

| INSTRUMENTAL CONDITIONS | |
|---|---|
| Instrument | Hewlett-Packard 5880A |
| Column | 60 meters × 0.20 millimeter inner diameter I.D., coated with SP-2340, 0.2 micron film thickness, Supelco #2-4023 |
| Column head pressure | 15.0 pounds per square inch |
| Carrier gas | Helium |
| Injector "A" temperature | 210° C. |
| Split vent flow | 60 milliliters/minute |
| Septum purge | 1.0 milliliters/minute |
| Oven temperature profile: | |
| Initial temperature | 150° C. |
| Initial time | 0 minute |
| Rate 1 | 1.30° C./minute |
| Final temp 1 | 185° C. |
| Final time 1 | 0 minute |
| Rate 2 | 10.00° C./minute |
| Final temp 2 | 225° C. |
| Final time 2 | 10.00 minute |
| Post Value | 225° C. |
| Post Time | 0 minute |
| Detector | FID |
| Detector temp | 230° C. |
| Make-up gas | 30 milliliters/minute |
| Detector $H_2$ flow | 30 milliliters/minute |
| Detector air flow | 400 milliliters/minute |

2. Analysis of Samples - (The samples are analyzed with an area normalization procedure.)
   a. Prepare fatty acid methyl esters of the reference standard and triglycerides of the components of the shortening of the present invention.
   b. Set up a sequence in the LAS data system to inject the samples and reference standard.
   c. Activate the autosampler to inject 1.0 microliter of the samples and standard in the sequence. The gas chromatograph will automatically begin its temperature program and the data system will collect and analyze the data for the sequence.
3. The peak areas for each methyl ester are electronically integrated by the data system.

B. Infrared (IR) Trans Measurement

The content of trans-isomers of unsaturated fatty acids in the frying fat of the present invention and the components therein is measured by infrared spectrometry. The method used is identical to that described by Madison et al. in "Accurate Determination of Trans Isomers in Shortening and Oils by Infrared Spectrophotometry," in *J. Amer. Oil Chem. Soc.*, Vol. 59, No. 4 (April, 1982), pp. 178-81, (herein incorporated by reference), with two exceptions: 1) the method utilized in the present invention employed a Nicolet, Model 20DXC, Infrared Spectrometer (Nicolet Instrument Corporation, Madison, Wis.) which was equipped with a deuterated triglycine-sulfate detector and used in lieu of a Beckman IR012 spectrophotometer; and 2) methyl stearate was replaced with methyl oleate as a calibration standard to be used with methyl elaidate in the construction of the calibration curve.

C. Solid Fat Content

The method for determining Solid Fat Content (SFC) values of a fat by PMR is described in AOCS Official Method CD 16-81, (herein incorporated by reference). Before determining SFC values, the fat sample is heated to a temperature of 60° C. for at least 0.5 hours or until the sample is completely melted. The melted sample is then tempered at a temperature of 26.7° C. for 15 minutes, 0° C. for 15 minutes, 26.7° C. for 30 minutes, and 0° C. for 15 minutes. After tempering the SFC value of the fat sample at temperatures of 10° C., 21.1° C., 26.7° C., 33.3° C., and 40.5° C. is determined by pulsed magnetic resonance (PMR) after equilibrating for 30 minutes at each temperature.

What is claimed is:

1. A low-saturate frying fat which comprises:
   (a) about 40% to about 80% intermediate-melting fat, said intermediate-melting fat comprising from about 14% to about 35% $C_{12}$-$C_{18}$ saturated fatty acids; at least about 40% trans-isomers of unsaturated fatty acids by percentage of total fat at least about 46% of all double bonds in the trans configuration; at least about 40% solids (SFC) at 21.1° C. (70° F.); and an iodine value of about 55 to about 75; and
   (b) about 20% to about 60% unhydrogenated or partially-hydrogenated base oil, said base oil comprising no more than about 11% $C_{12}$-$C_{18}$ saturated fatty acids; and an iodine value of about 75 or more.

2. A frying fat according to claim 1 which comprises:
   (a) less than about 20% $C_{12}$-$C_{18}$ saturated fatty acids;
   (b) from about 25% to about 45% solids (SFC) at 21.1° C. (70° F.); and
   (c) less than about 8% solids (SFC) at 40.6° C. (105° F.).

3. A frying fat according to claim 2 which comprises:
   (a) about 50% to about 70% intermediate-melting fat, said intermediate-melting fat comprising from about 16% to about 30% $C_{12}$-$C_{18}$ saturated fatty acids; at least about 45% trans-isomers of unsaturated fatty acids by percentage of total fat; at least about 55% of all double bonds in the trans configuration; at least about 45% solids (SFC) at 21.1° C. (70° F.); and an iodine value of about 60 to about 70; and
   (b) about 30% to about 50% unhydrogenated or partially hydrogenated base oil, said base oil comprising no more than about 8% $C_{12}$-$C_{18}$ saturated fatty acids; and an iodine value of about 77 or more.

4. A frying fat according to claim 2 which additionally comprises less than about 7% fully- or substantially-hydrogenated hardstock, said hardstock having an iodine value of about 20 or less.

5. A frying fat according to claim 4 which comprises less than about 5% fully- or substantially-hydrogenated hardstock.

6. A frying fat according to claim 5 which comprises less than about 3% fully. or substantially-hydrogenated hardstock.

7. A frying fat according to claim 4 wherein the fully- or substantially-hydrogenated hardstock has an iodine value of about 10 or less.

8. A frying fat according to claim 7 wherein the fully- or substantially-hydrogenated hardstock has an iodine value of about 5 or less.

9. A frying fat according to claim 3 wherein the intermediate-melting fat of (a) has no more than about 12% $C_{18:2}$ fatty acids.

10. A frying fat according to claim 9 wherein the intermediate melting fat of (a) has no more than about 8% $C_{18:2}$ fatty acids.

11. A frying fat according to claim 10 wherein the intermediate-melting fat of (a) has not more than about 3% $C_{18:2}$ fatty acids.

12. A frying fat according to claim 3 wherein the intermediate-melting fat of (a) has no more than about 15% $C_{16}$ saturated fatty acids.

13. A frying fat according to claim 12 wherein the intermediate-melting fat of (a) has no more than about 12% $C_{16}$ saturated fatty acids.

14. A frying fat according to claim 3 wherein the base oil of (b) has no more than about 5% $C_{18:3}$ fatty acids.

15. A frying fat according to claim 3 wherein the base oil of (b) has no more than about 20% trans-isomers of unsaturated fatty acids.

16. A frying fat according to claim 2 which comprises less than about 18% $C_{12}$-$C_{18}$ saturated fatty acids.

17. A frying fat according to claim 2 which comprises from about 30% to about 40% solids (SFC) at 21.1° C. (70° F.).

18. A frying fat according to claim 2 which comprises less than about 5% solids (SFC) at 40.6° C. (105° F.).

19. A frying fat according to claim 2 which comprises from about 40% to about 80% of an intermediate-melting fat, wherein said intermediate melting fat is prepared by selective hydrogenation and wherein said intermediate-melting fat comprises from about 14% to about 35% $C_{12}$-$C_{20}$ saturated fatty acids; at least about 40% trans-isomers of unsaturated fatty acids by percentage of total fat; at least about 46% of all double bonds in the trans configuration; at least about 40% solids (SFC) at 21.1° C. (70° F.); and an iodine value of about 55 to about 75.

20. A frying fat according to claim 19 wherein the selective hydrogenation is performed using a sulfur-treated nickel catalyst.

21. A frying fat according to claim 1 wherein the intermediate-melting fat of (a) is prepared from source oils and oil fractions having less than about 35% total saturated fatty acids and less than about 15% $C_{16}$ saturated fatty acids.

22. A frying fat according to claim 21 wherein the source oils and oil fractions are selected from the groups consisting of, but not limited to, soybean, cottonseed, peanut, olive, corn, menhaden, herring, linseed, sesame, rice, bran, perrilla, canola, safflower, sunflower, sorghum, cottonseed olein, palm olein, and mixtures thereof.

23. A method for frying foods in a frying fat wherein the frying fat comprises:
   (a) about 40% to about 80% intermediate-melting fat, said intermediate-melting fat comprising from about 14% to about 35% $C_{12}$–$C_{18}$ saturated fatty acids; at least about 40% trans-isomers of unsaturated fatty acids by percentage of total fat; at least about 46% of all double bonds in the trans configuration; at least about 40% solids (SFC) at 21.1° C (70° F.); and an iodine value of about 55 to about 75; and
   (b) about 20% to about 60% unhydrogenated or partially hydrogenated base oil, said base oil comprising no more than about 11% $C_{12}$–$C_{18}$ saturated fatty acids; and an iodine value of about 75 or more.

24. A method for frying foods according to claim 23 wherein the frying fat comprises:
   (a) less than about 20% $C_{12}$–$C_{18}$ saturated fatty acids;
   (b) from about 25% to about 45% solids (SFC) at 21.1° C. (70° F.); and
   (c) less than about 8% solids (SFC) at 40.6° C. (105° F.).

25. A method for frying foods according to claim 24 wherein the frying fat comprises:
   (a) about 50% to about 70% intermediate-melting fat, said intermediate-melting fat comprising from about 16% to about 30% $C_{12}$–$C_{18}$ saturated fatty acids; at least about 45% trans-isomers of unsaturated fatty acids by percentage of total fat; at least about 55% of all double bonds in the trans configuration; at least about 45% solids (SFC) at 21.1° C. (70° F.); and an iodine value of about 60 to about 70; and
   (b) about 30% to about 50% unhydrogenated or partially hydrogenated base oil, said base oil comprising no more than about 8% $C_{12}$–$C_{18}$ saturated fatty acids; and an iodine value of about 77 or more.

26. A method for frying foods according to claim 23 wherein the foods are selected from the group consisting of doughnuts, cruellers, fritters, turnovers, danish, fish, shrimp, chicken, vegetables, and french fries.

27. A method for frying foods according to claim 26 wherein the foods are doughnuts.

* * * * *